United States Patent Office 3,286,973
Patented Nov. 22, 1966

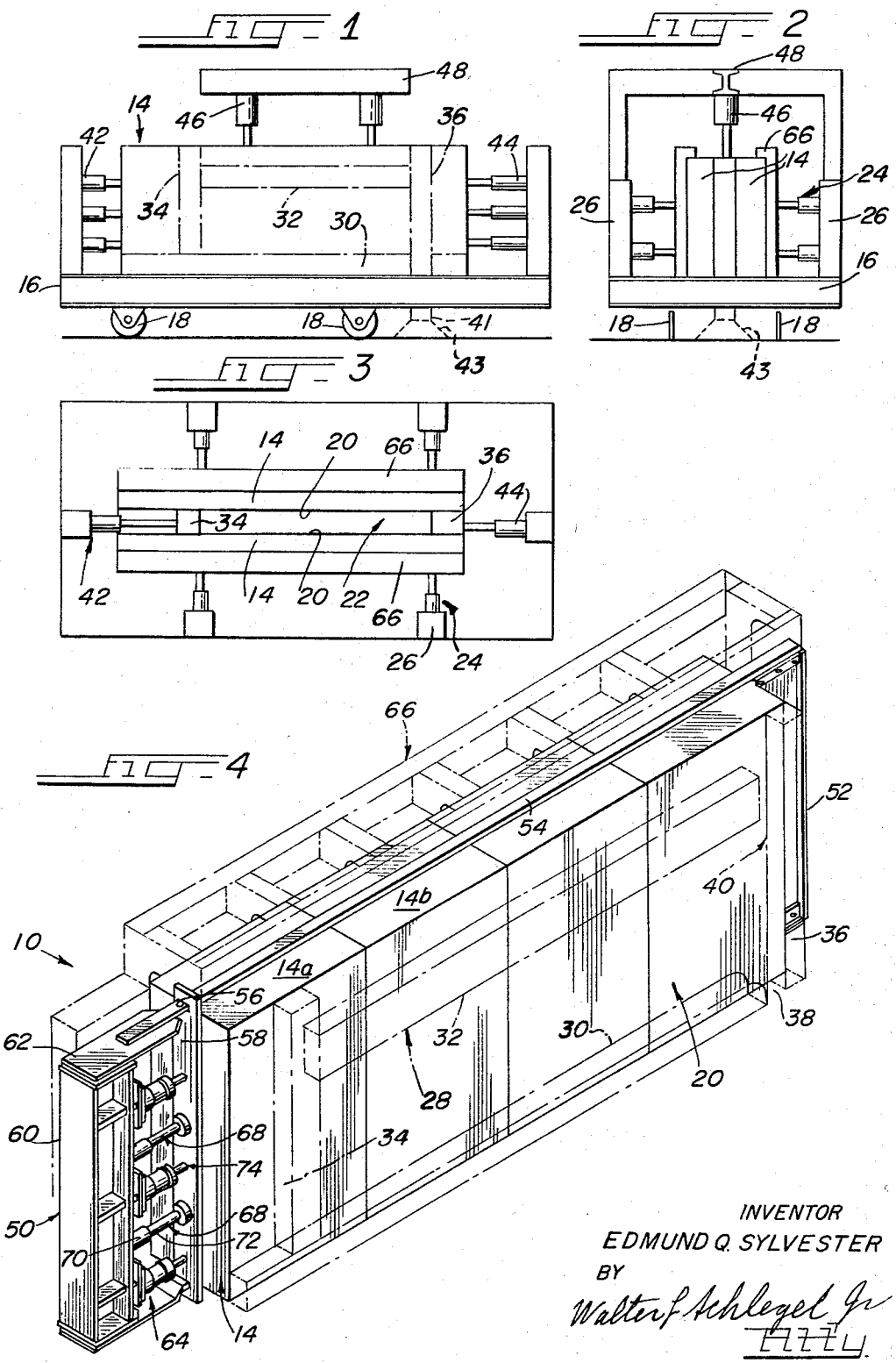

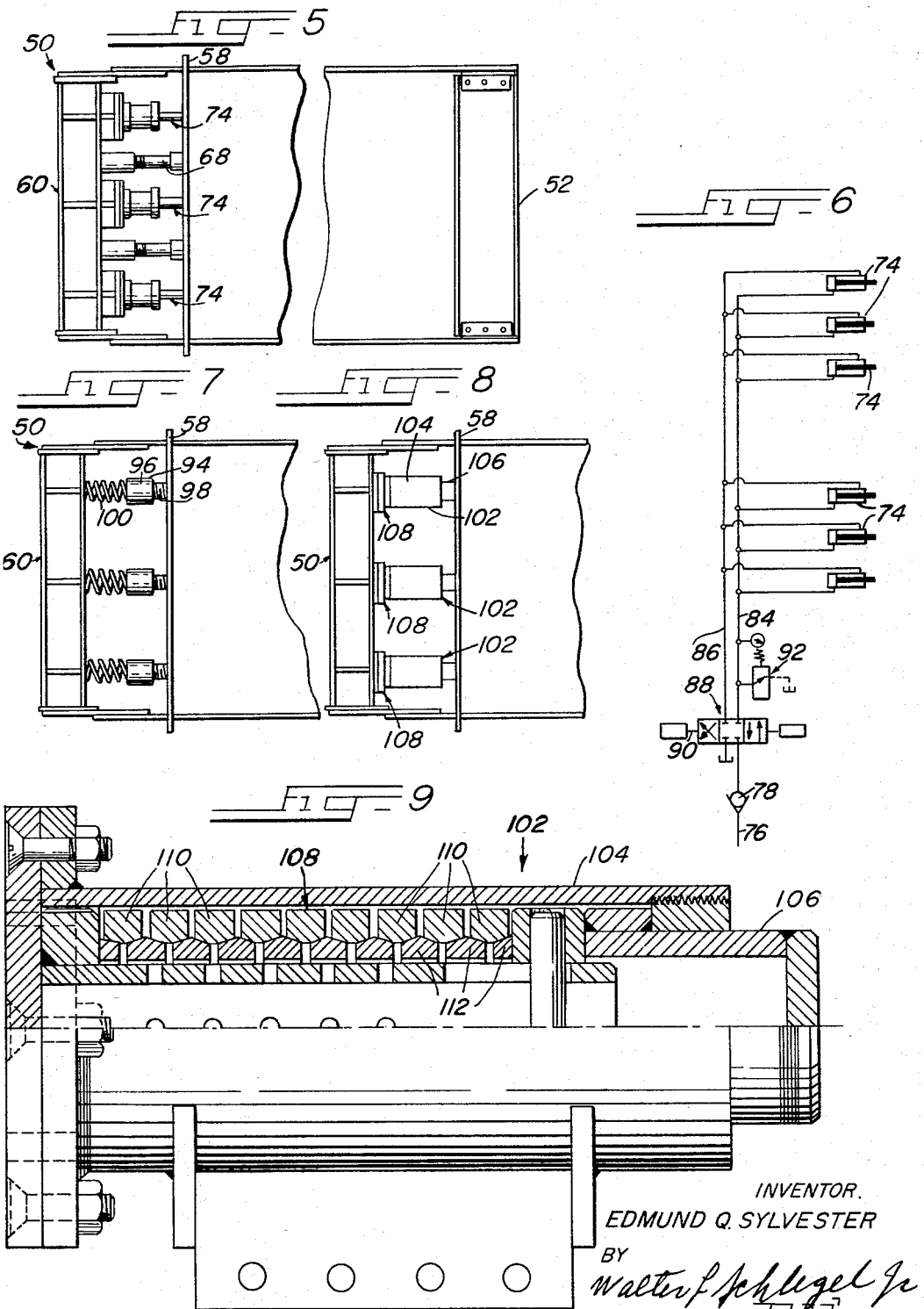

3,286,973
MOLD CLAMPING APPARATUS
Edmund Q. Sylvester, 2749 Landon Road,
Shaker Heights, Ohio
Filed Dec. 30, 1964, Ser. No. 422,160
10 Claims. (Cl. 249—82)

The present invention relates to mold apparatus and method.

The mold apparatus of the present invention is adapted particularly for use in large molds having main side blocks of large proportions, and of such great proportions as to render them difficult to fabricate.

A principal object of the invention is to provide novel construction of such large mold blocks each of which is made up of a plurality of small sections put together in unitary assembly.

Another object is to provide novel construction of mold block of the character referred to enabling forming of a continuous surface on the plurality of sections making up the mold block which is of uniform accuracy to present an effective single surface to form a smooth surface on the casting made in the mold in which it is used.

Still another object is to provide mold blocks of the foregoing character each made up of a plurality of smaller sections and including novel clamping means for clamping a plurality of sections together in a unitary assembly.

A further object is to provide novel clamping means of the character just referred to including specifically means for clamping the sections in a portable assembly enabling planing of a continuous surface on the plurality of sections and facilitating putting the assembly in position in the mold, in conjunction with additional clamping means for use with the assembly when the assembly is in position in the mold, for continuously compensating for discrepencies such as are caused by differential expansion and contraction of elements of the structure.

Other objects and advantages of the invention will appear from the following detailed description taken in conjunction with the accompanying drawings in which:

FIGURE 1 is a side elevational view, of small scale and semi-diagrammatic in nature, of a mold of the kind to which the present invention is particularly adapted;

FIGURE 2 to a top view of the mold of FIGURE 1;

FIGURE 3 is an end view of the mold of FIGURE 1;

FIGURE 4 is a large scale perspective view of a mold unit made according to the present invention;

FIGURE 5 is a side view of the clamping frame used in FIGURE 4;

FIGURE 6 is a diagram of the hydraulic circuit used in one of the present devices of FIGURE 5;

FIGURE 7 is a partial side view of a clamping frame showing an alternative arrangement relative to FIGURE 5;

FIGURE 8 is a view similar to FIGURE 7 showing another alternative arrangement relative to FIGURES 5 and 7; and FIGURE 9 is a detail view, partially in section, of the interior of one of the clamping devices of FIGURE 8.

Referring now in detail to the drawings, the mold unit shown in FIGURE 4 and designated 10 in its entirety is adapted for use in a mold of the general character shown in FIGURES 1, 2 and 3, there being two such mold units used in a mold. The mold to which the present invention is particularly adapted is of large and even immense dimensions, for casting slabs, etc., and may be as long as 30 or 40 feet. Such a large scale mold obviously is difficult to fabricate particularly the main side blocks 14. The blocks in the mold unit of the present invention are preferably made of graphite (as are the other blocks) and are at least as long, and slightly longer than, the dimension indicated, namely 30 to 40 feet; these main side blocks may also be 5 or 6 feet high and, to provide the necessary strength, are several feet thick. Blocks of such dimensions are extremely difficult to fabricate, as for example in providing a furnace of the necessary size.

The mold structure 10 shown in FIGURES 1, 2 and 3 and in which the large main side blocks are incorporated, includes a base or platform 16 preferably mounted on wheels to facilitate transportation thereof to and from a pouring position. The main side blocks 14 are mounted in opposed relation with inner surfaces 20 facing each other and defining opposite side surfaces of the mold cavity 22. The main side blocks 14 are mounted for movement toward and from each other by suitable power means 24 which may be hydraulic or mechanical devices of known type, supported in the mold structure and working against suitable elements in the mold structure such as posts 26 on the base 16. These power devices also serve to retain the main side blocks in position against outward forces produced by the molten metal in the cavity, in the casting operation.

Between the main side blocks 14 is a set of inner blocks indicated in the aggregate at 28 and including a bottom block 30, a top block 32, a rear end block 34 and a front end block 36 (see FIGURE 4). A pouring passage 38 is provided between the front end of the bottom block 30 and the front end block 36 while a riser passage 40 is provided between the front end of the top block 32 and the front end block 36. A pouring tube is indicated at 41 (FIGURES 1 and 3) and a ladle 43, both of which are of known kind. The rear end block is moved into position and retained there by suitable power devices 42 similar to the power devices 24 while the front end block 36 is moved into position and retained there by power devices 44 similar to the power devices 24. In the same manner the top block 28 is moved into position and retained there by power devices 46 supported on an overhead beam 48 in turn supported in a suitable manner on the base or platform 16. Further details of the mold structure of FIGURES 1 to 3 need not be entered into. The mold unit 10 is adapted for use as one of the main side blocks 14 in the mold structure.

The mold unit 10 includes a graphite block 14 made up of a plurality of sections 14a, 14b, etc. In the present instance four such sections are illustrated, but it will be understood that any desired number may be incorporated within practical limits. The block sections 14a, 14b, etc., are incorporated in a clamping frame indicated in its entirety at 50 which with the block sections constitute a self-sustaned unitary assembly which can be placed in position, in such assembled form, in the mold structure of FIGURES 1, 2 and 3.

The clamping frame 50 includes an end member 52 of suitable design and strength which may be an I-beam engaging the end surface of the adjacent end block section. This I-beam is of a length substantially equal to the height of the sections and secured to the ends of the I-beam are tie members 54, as by welding or otherwise, which may be of any suitable size and shape such as flat strips as here shown, round, or otherwise. These tie members pass through apertures 56 in an end plate 58 fitted against the opposite end surface of the block sections and which with the I-beam 52 clamp the block sections therebetween through the medium of clamping means to be described hereinbelow.

The extended ends of the tie members 54 beyond the end plate 58 are welded or otherwise secured to an end member 60 which may be of fabricated form as illustrated, or an I-beam, etc. This end member 60 includes plates 62 to which the ends of the tie members 54 are directly secured.

Clamping means or jacks indicated in their entirety at 64 are interposed between the end member 60 and the end plate 58 and when extended in an operation described hereinbelow, they clamp the block sections between the I-beam 52 and the end plate 58. This forms a unitary assembly of the clamping frame and the block sections, which can be transported bodily to and from the place of assembly to the mold structure of FIGURES 1, 2 and 3.

Preferably the block sections are so positioned in the clamping frame that the tie members 54 are adjacent the center of the block sections relative to the thickness of the latter. A suitable flask structure 66 may be utilized for moving the mold unit in the mold structure of FIGURES 1, 2 and 3. This flask structure need not be described in detail, but suffice it to say that it is a rigid steel framework designed for abutting the mold unit throughout a well distributed area to avoid undue localized forces against the mold structure in the movements of the mold unit toward and from a counterpart unit in the manner described above.

The block sections 14a, 14b, etc., may be of any desired dimensions, particularly in the length direction of the block, and may be as small as desired to facilitate manufacture and handling of them. However, making up a block from a plurality of sections possesses difficulties in forming a smooth and continuous accurate surface 20 since in placing the block sections in mutually abutting relation the slight irregularities of the interfacing surfaces, as well as possibly other surfaces, work against forming such a continuous and accurate surface 20. The construction of the present invention is particularly adapted to forming such a continuous accurate surface because the mold unit 10 is completely portable in its assembled position and the unit may be subjected to a planing operation or other operation for forming such continuous accurate surface 20, the planing machine passing progressively and continuously from one block section to the next, forming the surface as through the block were integral.

To the end of facilitating the portability of the mold unit the clamping or power means 64 includes one or more, and in the present instance two, mechanical jacks 68 which are self-sustained and completely contained in the mold unit. Each jack 68 may include a sleeve 70 fixed for example on the end member 60 and an extensible element 72 therein which, upon threading out and engaging the end plate 58, provides the clamping action referred to above. The unit as thus clamped and carrying the jacks 68 (as well as the remaining components of the clamping means 64) may, upon assembly, be subjected to the planing operation referred to, and upon completion of that operation, the unit and a similar and counterpart unit are transported to the mold structure of FIGURES 1, 2 and 3 and put in position.

In the casting operation various elements of the mold change dimensions due to expansion and contraction, and different kinds of elements expand and contract at different rates. Such is the case as between steel and graphite. The hot molten steel on engaging the graphite blocks in the casting operation, of course causes the graphite to expand but the steel elements in the structure, particularly the tie members 54, expand more than the graphite. Accordingly the spacing between end member 60 and the end plate 58 increases and the threaded mechanical jacks, being of non-yielding nature, cease performing their clamping action, notwithstanding their advantage in being self-sustained from the standpoint of portability of the unit. To compensate for this discrepency yieldable and constantly biasing power means 74 are provided which are preferably of hydraulic nature and the hydraulic fluid produces constant biasing effect to take up the slack caused by the differential expansion referred to. Any desired number of such hydraulic power devices 74 may be used, such as three as herein shown. The hydraulic power devices 74 may be carried with the mold unit, or put in place after the mold unit is in the mold structure, as desired, but in either case the hydraulic pressure is applied after the mold unit is in place.

FIGURE 6 shows a diagram of a suitable hydraulic circuit for use with the hydraulic power devices 74. These devices are shown in the circuit, there being two sets thereof, one for each of the mold units to be used in the mold. The fluid is introduced through a line 76 by a suitable pump through a check valve 78 then through an inlet line 84. A return line 86 leads from the power devices. Conventional valve means is shown at 88 including a movable member 90 which in the central position shown locks the fluid in the power devices. For applying pressure to the power devices, the valve means 88 is shifted to the left, and to release the power devices, it is shifted to its far right position. A suitable pressure relief valve 92 is also included.

There must be a pre-determined pressure established between the block sections such, for example, as in the neighborhood of 100 lbs. per square inch. In assembling the block sections the mechanical jacks 68 are extended to provide a workable pressure from the standpoint of forming a unified assembly and enabling planing of the surface 20. After the mold unit is put in position in the mold structure, the hydraulic power devices 74 are activated to produce a pressure sufficiently greater than the necessary minimum pressure (e.g. 100 lbs. p.s.i. as indicated above) to maintain that necessary minimum pressure upon expansion of the tie members 54 in the casting operation as referred to above, and consequent increases in the spacing between the end member 60 and the end plate 58. This overage in pressure may vary of course depending upon a member of different factors, and the desired overage may be found by practical experimentation.

The arrangement shown in FIGURE 7 is an alternative to the clamping means described above. In the present instance jacks 94 are provided similar to the jacks 68, i.e. each includes a sleeve 96 and an extensible element threaded therein. The extensible element 98 engages the end plate 58 while a coil compression spring 100 is interposed between the sleeve 96 and the end member 50. In the use of the present jacks the extensible element 98 is threaded out into clamping position in the assembly of the unit to an extent producing the desired pressure plus the overage that will be required to compensate for the increase in spacing between the end plate 58 and the end member 50. In such condition the springs 100 will be compressed but as the spacing increases, the springs extend and continue to maintain a pressure at least as great as the necessary minimum pressure desired. It will be understood that the springs 100 may be of any suitable size for the purpose desired, as well as being made of material selected for the purpose.

The clamping means of FIGURE 8 is another modification of a clamping means that is self-contained within the mold unit but which also compensates for later discrepencies occurring in the casting operation. In the present instance mechanical jacks 102 are employed each including an outer sleeve 104 in which an extensible element 106 is threaded. The extensible element 106 engages the end plate 58 while a compensating member 108 is interposed between the sleeve 104 and the end member 60. The compensating member 108 may be what is known as a "ring spring" put out by Edgewater Spring Company, Pittsburgh, Pennsylvania, and shown in FIGURE 9. This device includes a series of outer steel rings 110 and a series of inner steel rings 112 both of which are continuous circumferentially. The rings in each series are spaced apart axially and the rings of the two series interengage on surfaces which are inclined or wedge-shaped, each ring having an apex or ridge positioned between the inner facing surfaces of adjacent rings of the other series.

The device has a normal position in which the outer and the inner rings are in interengagement, but they are capable of being compressed in axial direction upon application of necessary force. This degree of compression is of course quite small, and upon release of that force the rings, acting through their tapered surfaces, assume their extended normal position.

This "ring spring" functions at least to a degree similar to the spring 100 of FIGURE 7 and in the use of the device of FIGURE 8 the jacks 102 are extended sufficiently to produce the overage in pressure between the block sections, mentioned above, and in this step of the operation the "ring spring" is compressed and later in the casting operation upon increase in the spacing between the end plate 58 and end member 60 the "ring spring" extends as mentioned above and maintains the necessary minimum pressure between the block sections.

While I have herein shown and described a preferred form of the invention, it will be understood that changes may be made therein within the scope of the appended claims.

I claim:

1. A mold structure comprising a block made up of a plurality of sections in mutually abutting engagement, and clamping means retaining the sections in assembly as a unit, the unit including the sections and clamping means being insertable in and removable from said mold, the block sections having a common continuous surface extending throughout the area of all of the sections and defining one surface of a cavity in said mold structure, the clamping means including a mechanical screw threaded jack and spring means in series therewith, the screw threaded jack being of non-yielding character and the spring means being of yielding and constantly biasing character.

2. A mold structure comprising a block made up of a plurality of sections in mutually abutting engagement, and clamping means retaining the sections in a unitary assembly, the unit, including the sections and clamping means assembled together as a unit, being insertable in and removable from said mold structure, the clamping means being independent of means for securing the unit to other elements of the mold structure, the block sections having a common continuous surface extending throughout the area of all of the sections defining one surface of a cavity in said mold structure, said common continuous surface, when the unit is free of said mold structure, being fully exposed to the exterior.

3. The invention set out in claim 2 in which the clamping means includes a frame surrounding the block sections and pressure means in the frame for exerting pressure on the block sections for retaining them in assembled relation.

4. The invention set out in claim 3 in which the pressure means is operable for applying constantly biasing pressure against the block sections to compensate for variations in relative dimensions between the block sections and the clamping frame in the casting operation whereby the block sections will be constantly clamped in firm abutting engagement.

5. The invention set out in claim 2 wherein the block sections are made of graphite and disposed in end-to-end engagement in an endwise direction of the block, the clamping means includes a steel frame encircling the block sections, the steel clamping frame and graphite block sections have different coefficients of thermal expansion, and the pressure means includes a portion operable for constantly applying biasing pressure against the blocks for retaining the blocks in firm abutting engagement.

6. The invention set out in claim 5 wherein the pressure means includes first pressure means that is non-yielding and of mechanical nature, and completely incorporated in and portable with the unit, and second pressure means of yielding nature and operable for constantly applying biasing pressure for forcing the block sections into firm abutting engagement.

7. The invention set out in claim 6 wherein the second pressure means includes hydraulic power devices carried by the unit, and a hydraulic system separate from the unit but connectable to the power devices and operative for controlling and operating the power devices when the unit is in position in a mold.

8. The invention set out in claim 7 wherein the mechanical pressure means includes screw jacks each including a base portion working against one element of the clamping frame and a threaded extensible member working in the base portion and working against another element of the clamping frame.

9. The invention set out in claim 1 wherein the spring means is a coiled compression spring.

10. The invention set out in claim 1 wherein the spring means includes an outer and an inner series of continuous steel rings, the rings in each series being normally axially spaced apart and the rings of the two series having wedge shaped surfaces interengaging, the spring means being compressable in axial direction but resuming their normal position upon removal of forces tending to compress them.

References Cited by the Examiner

UNITED STATES PATENTS

| 923,521 | 6/1909 | Herron | 249—161 |
|---|---|---|---|
| 1,064,949 | 6/1913 | Wills | 249—161 |
| 1,542,639 | 6/1925 | Pettis | 249—161 |
| 2,153,087 | 4/1939 | Knapp | 249—160 |
| 3,212,142 | 10/1965 | Moritz | 22—57.2 |

J. SPENCER OVERHOLSER, *Primary Examiner.*

MARCUS U. LYONS, *Examiner.*

E. MAR, *Assistant Examiner.*